(12) United States Patent
Umeda

(10) Patent No.: US 8,351,042 B1
(45) Date of Patent: Jan. 8, 2013

(54) OBJECT DETECTING DEVICE AND INFORMATION ACQUIRING DEVICE

(75) Inventor: Katsumi Umeda, Niwa-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/599,877

(22) Filed: Aug. 30, 2012

Related U.S. Application Data

(63) Continuation of application No. PCT/JP2011/062683, filed on Jun. 2, 2011.

(30) Foreign Application Priority Data

Sep. 28, 2010 (JP) .................. 2010-217975
May 25, 2011 (JP) .................. 2011-116703

(51) Int. Cl.
*G01N 21/55* (2006.01)
(52) U.S. Cl. .................................... 356/445
(58) Field of Classification Search ........... 356/445–448
See application file for complete search history.

(56) References Cited

U.S. PATENT DOCUMENTS

| 6,453,006 | B1 * | 9/2002 | Koppel et al. ............ 378/86 |
| 2010/0027021 | A1 * | 2/2010 | Nebosis et al. ............ 356/456 |
| 2010/0091301 | A1 | 4/2010 | Masuda | |
| 2010/0328649 | A1 | 12/2010 | Ota et al. | |

FOREIGN PATENT DOCUMENTS

| JP | 8-5348 | A | 1/1996 |
| JP | 8-29129 | A | 2/1996 |
| JP | 2005-315728 | A | 11/2005 |
| JP | 2010-91492 | A | 4/2010 |
| JP | 2010-101683 | A | 5/2010 |
| JP | 2011-7576 | A | 1/2011 |

OTHER PUBLICATIONS

International Search Report for PCT Application No. PCT/JP2011/062683 dated Aug. 23, 2011, pp. 1-4.
Makino, H. et al., Proposal of an easy calibration method of active stereo range image sensors, journal, Sep. 2001, pp. 1-4, Tokyo, Japan.
Written Opinion for PCT Application No. PCT/JP2011/062683 dated Aug. 23, 2011, pp. 1-6.

* cited by examiner

*Primary Examiner* — Tara S Pajoohi Gomez
(74) *Attorney, Agent, or Firm* — Ditthavong Mori & Steiner, P.C.

(57) ABSTRACT

An information acquiring device has a light source which emits light of a predetermined wavelength band; a projection optical system which projects the light emitted from the light source toward the target area with a predetermined dot pattern; and a light receiving element which receives reflected light reflected on the target area for outputting a signal. In this arrangement, the projection optical system projects the light toward the target area in such a manner that a dot of a reference pattern of the light to be received by the light receiving element has a pitch equal to or larger than 2.5 pixels at least in an alignment direction in which the light source and the light receiving element are aligned.

16 Claims, 11 Drawing Sheets

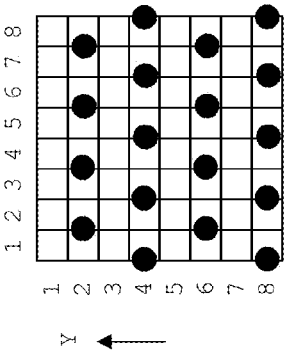
FIG. 6A
<DEVIATION BY HALF PIXEL IN LEFT DIRECTION AND IN UPPER DIRECTION>
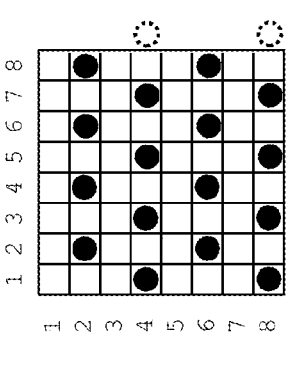
FIG. 6B
<REFERENCE PATTERN>
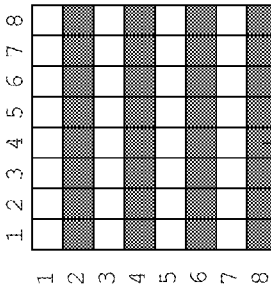
FIG. 6C
<DEVIATION BY HALF PIXEL IN LEFT DIRECTION>
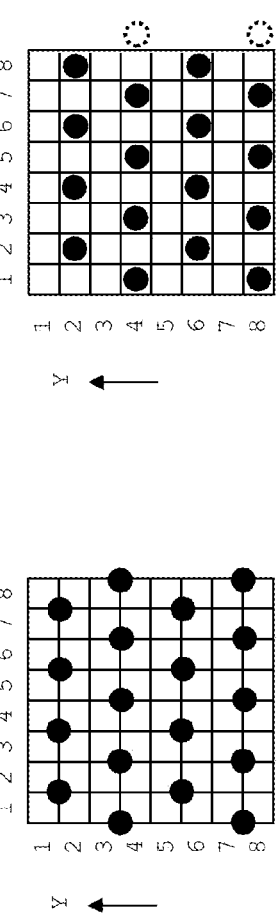
FIG. 6D
PIXEL VALUE=H/4
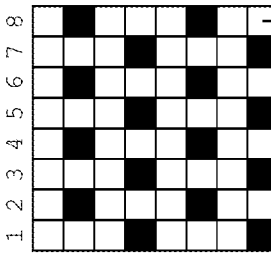
FIG. 6E
PIXEL VALUE=H
PIXEL VALUE=0
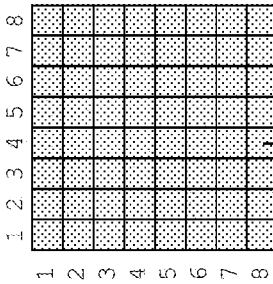
FIG. 6F
PIXEL VALUE=H/2
COMPARISON

<DEVIATION BY HALF PIXEL IN LEFT DIRECTION AND IN UPPER DIRECTION>

<REFERENCE PATTERN>

<DEVIATION BY HALF PIXEL IN LEFT DIRECTION>

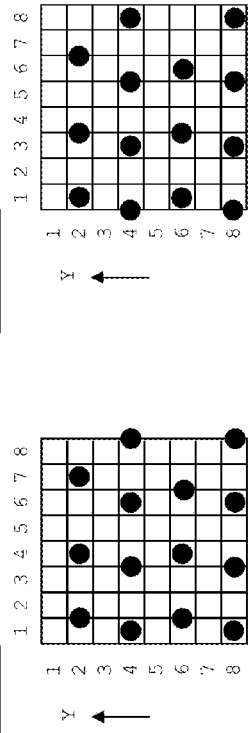
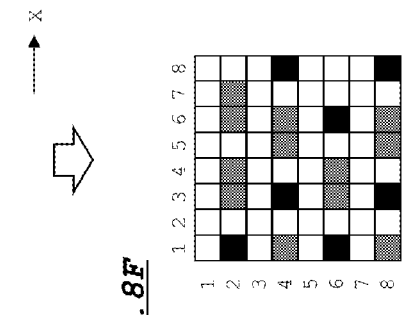
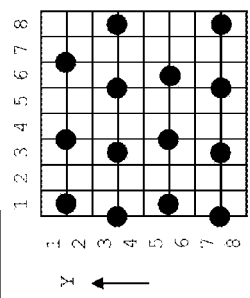
FIG.8A <DEVIATION BY HALF PIXEL IN LEFT DIRECTION AND IN UPPER DIRECTION>
FIG.8B <REFERENCE PATTERN>
FIG.8C <DEVIATION BY HALF PIXEL IN LEFT DIRECTION>
FIG.8D
FIG.8E
FIG.8F

<DEVIATION BY HALF PIXEL IN LEFT DIRECTION AND IN UPPER DIRECTION>

<REFERENCE PATTERN>

<DEVIATION BY HALF PIXEL IN LEFT DIRECTION>

<DEVIATION BY HALF PIXEL IN LEFT DIRECTION AND IN UPPER DIRECTION>

<REFERENCE PATTERN>

<DEVIATION BY HALF PIXEL IN LEFT DIRECTION>

■ PIXEL VALUE=0
▨ PIXEL VALUE=H/2
▦ PIXEL VALUE=H/4

■ PIXEL VALUE=H
□ PIXEL VALUE=0
▨ PIXEL VALUE=H/2

■ PIXEL VALUE=H
□ PIXEL VALUE=0
▨ PIXEL VALUE=H/2

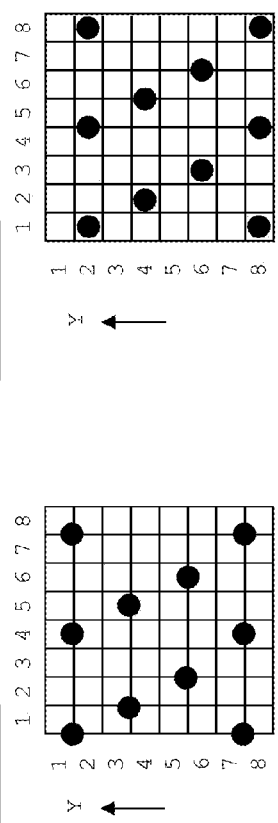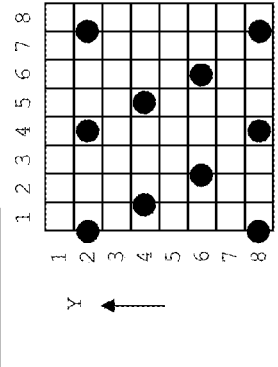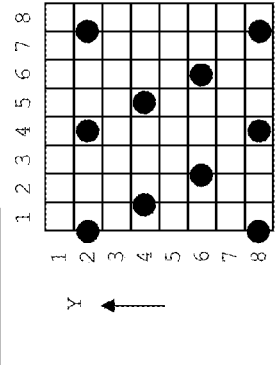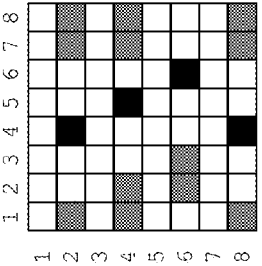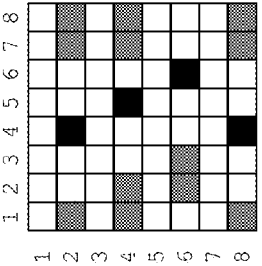

OBJECT DETECTING DEVICE AND INFORMATION ACQUIRING DEVICE

This application claims priority under 35 U.S.C. Section 119 of Japanese Patent Application No. 2010-217975 filed Sep. 28, 2010, entitled "OBJECT DETECTING DEVICE AND INFORMATION ACQUIRING DEVICE" and Japanese Patent Application No. 2011-116703 filed May 25, 2011, entitled "OBJECT DETECTING DEVICE AND INFORMATION ACQUIRING DEVICE". The disclosures of the above applications are incorporated herein by reference.

BACKGROUND OF THE INVENTION

1. Field of the Invention

The present invention relates to an object detecting device for detecting an object in a target area, based on a state of reflected light when light is projected onto the target area, and an information acquiring device incorporated with the object detecting device.

2. Disclosure of Related Art

Conventionally, there has been developed an object detecting device using light in various fields. An object detecting device incorporated with a so-called distance image sensor is operable to detect not only a two-dimensional image on a two-dimensional plane but also a depthwise shape or a movement of an object to be detected. In such an object detecting device, light in a predetermined wavelength band is projected from a laser light source or an LED (Light Emitting Diode) onto a target area, and light reflected on the target area is received by a light receiving element such as a CMOS image sensor. Various types of sensors are known as the distance image sensor.

A distance image sensor configured to scan a target area with laser light having a predetermined dot pattern is operable to receive a dot pattern reflected on the target area on an image sensor for detecting a distance to each portion of an object to be detected, based on a light receiving position of the dot pattern on the image sensor, using a triangulation method (see e.g. pp. 1279-1280, the 19th Annual Conference Proceedings (Sep. 18-20, 2001) by the Robotics Society of Japan).

In the above method, for instance, laser light having a dot pattern is emitted in a state that a reflection plane is disposed at a position away from an irradiation portion of laser light by a certain distance, and the dot pattern of laser light irradiated onto the image sensor is retained as a template. Then, a matching operation is performed between a dot pattern of laser light irradiated onto the image sensor at the time of actual measurement, and the dot pattern retained in the template for detecting to which position on the dot pattern at the time of actual measurement, a segment area set on the dot pattern of the template has moved. The distance to each portion, in the target area, corresponding to each segment area, is calculated, based on the moving amount.

In the object detecting device thus constructed, at the time of actual measurement, a dot of laser light may be irradiated onto the image sensor in a state that the dot overlaps a plurality of pixels on the image sensor. In such a case, signals may be concurrently outputted from the pixels adjacent to each other, onto which the dot has been concurrently irradiated. As a result, in a dot pattern to be obtained based on an output from the image sensor, some borderlines between dots may not be discriminated as a whole. Thus, it may be impossible to perform a matching operation between a dot pattern of laser light irradiated onto the image sensor at the time of actual measurement, and the dot pattern retained in the template. As a result, detection precision of a distance to each portion of an object to be detected may be lowered.

SUMMARY OF THE INVENTION

A first aspect of the invention is directed to an information acquiring device for acquiring information on a target area using light. The information acquiring device according to the first aspect includes a light source which emits light of a predetermined wavelength band; a projection optical system which projects the light emitted from the light source toward the target area with a predetermined dot pattern; and a light receiving element which receives reflected light reflected on the target area for outputting a signal. In this arrangement, the projection optical system projects the light toward the target area in such a manner that a dot of a reference pattern of the light to be received by the light receiving element has a pitch equal to or larger than 2.5 pixels at least in an alignment direction in which the light source and the light receiving element are aligned.

A second aspect of the invention is directed to an object detecting device. The object detecting device according to the second aspect has the information acquiring device according to the first aspect.

BRIEF DESCRIPTION OF THE DRAWINGS

These and other objects, and novel features of the present invention will become more apparent upon reading the following detailed description of the embodiment along with the accompanying drawings.

FIGS. 6A through 6F are diagrams for describing a drawback to be involved in the case where the pitch of a dot is equal to 2 pixels.

FIGS. 8A through 8F are diagrams showing a dot pattern setting method in the embodiment.

FIGS. 11A through 11F are diagrams showing still another dot pattern setting method in the embodiment.

Figure 1:
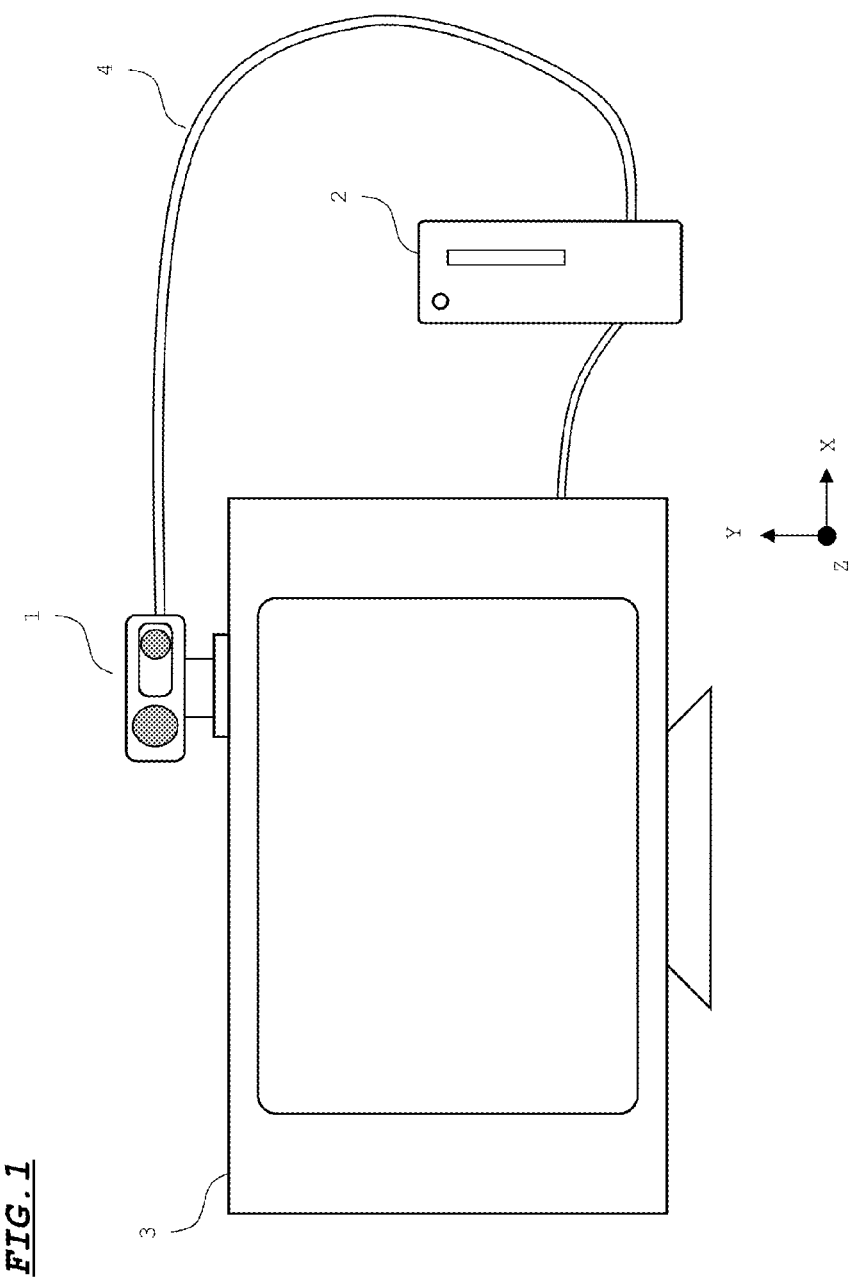
FIG. 1 is a diagram showing an arrangement of an object detecting device embodying the invention.

The drawings are provided mainly for describing the present invention, and do not limit the scope of the present invention.

DESCRIPTION OF PREFERRED EMBODIMENTS

In the following, an embodiment of the invention is described referring to the drawings. The embodiment is an example, wherein the invention is applied to an information acquiring device which is configured to irradiate a target area with laser light having a predetermined dot pattern.

In the embodiment, a laser light source 111 corresponds to a "light source" in the claims. A projection optical system 11 (a collimator lens 112, an aperture 113, a DOE 114) correspond to a "projection optical system" in the claims. A CMOS image sensor 124 corresponds to a "light receiving element" in the claims. The description regarding the correspondence between the claims and the embodiment is merely an example, and the claims are not limited by the description of the embodiment.

Firstly, a schematic arrangement of an object detecting device according to the first embodiment is described. As shown in FIG. 1, the object detecting device is provided with an information acquiring device 1, and an information processing device 2. A TV 3 is controlled by a signal from the information processing device 2.

The information acquiring device 1 projects infrared light to the entirety of a target area, and receives reflected light from the target area by a CMOS image sensor to thereby acquire a distance (hereinafter, called as "three-dimensional distance information") to each part of an object in the target area. The acquired three-dimensional distance information is transmitted to the information processing device 2 through a cable 4.

The information processing device 2 is e.g. a controller for controlling a TV or a game machine, or a personal computer. The information processing device 2 detects an object in a target area based on three-dimensional distance information received from the information acquiring device 1, and controls the TV 3 based on a detection result.

For instance, the information processing device 2 detects a person based on received three-dimensional distance information, and detects a motion of the person based on a change in the three-dimensional distance information. For instance, in the case where the information processing device 2 is a controller for controlling a TV, the information processing device 2 is installed with an application program operable to detect a gesture of a user based on received three-dimensional distance information, and output a control signal to the TV 3 in accordance with the detected gesture. In this case, the user is allowed to control the TV 3 to execute a predetermined function such as switching the channel or turning up/down the volume by performing a certain gesture while watching the TV 3.

Further, for instance, in the case where the information processing device 2 is a game machine, the information processing device 2 is installed with an application program operable to detect a motion of a user based on received three-dimensional distance information, and operate a character on a TV screen in accordance with the detected motion to change the match status of a game. In this case, the user is allowed to play the game as if the user himself or herself is the character on the TV screen by performing a certain action while watching the TV 3.

Figure 2:
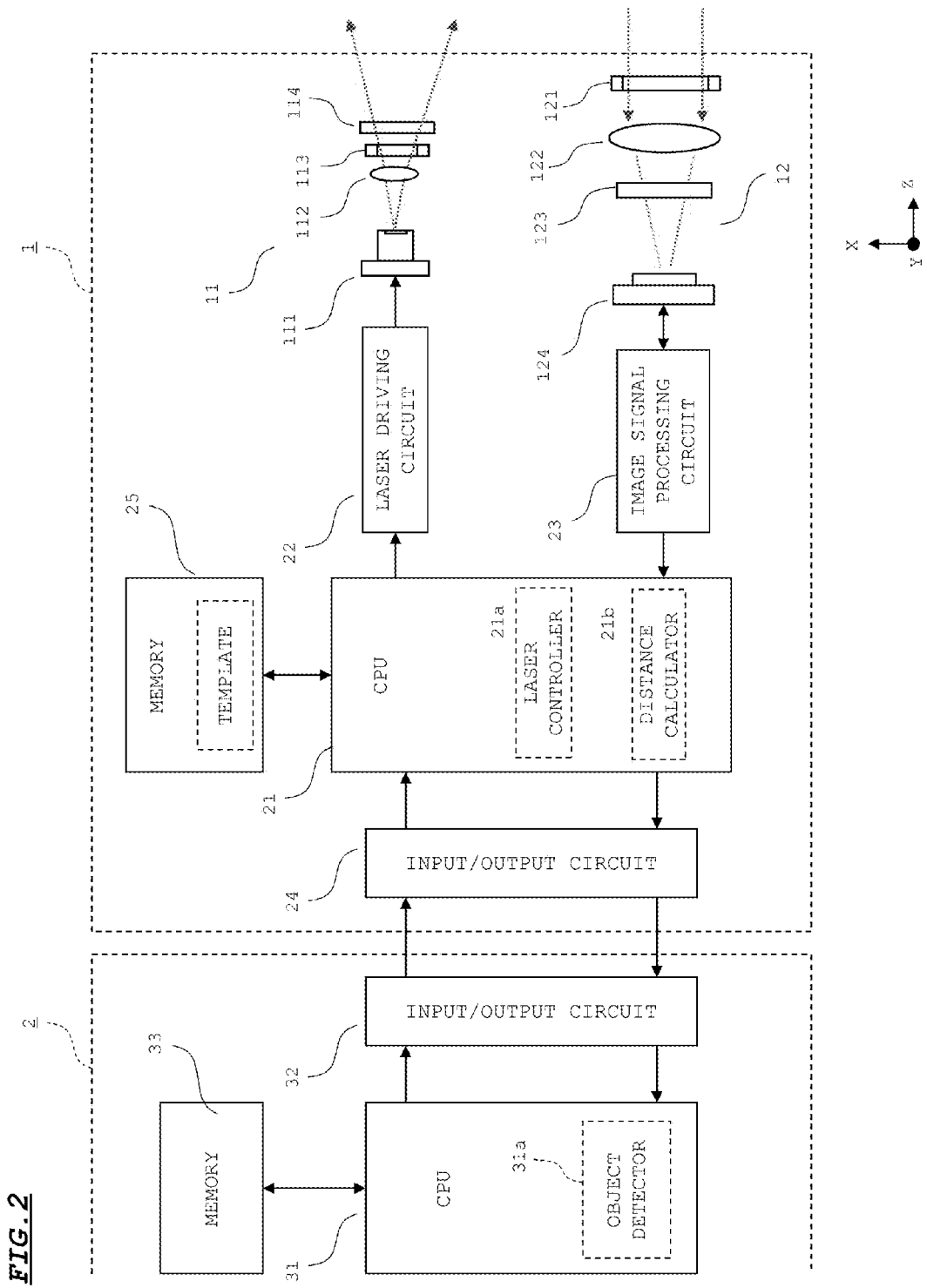
FIG. 2 is a diagram showing an arrangement of an information acquiring device and an information processing device in the embodiment.

FIG. 2 is a diagram showing an arrangement of the information acquiring device 1 and the information processing device 2.

The information acquiring device 1 is provided with a projection optical system 11 and a light receiving optical system 12, which constitute an optical section. The projection optical system 11 and the light receiving optical system 12 are disposed in the information acquiring device 1 side by side in X-axis direction.

The projection optical system 11 is provided with a laser light source 111, a collimator lens 112, an aperture 113, and a diffractive optical element (DOE) 114. Further, the light receiving optical system 12 is provided with an aperture 121, an imaging lens 122, a filter 123, and a CMOS image sensor 124. In addition to the above, the information acquiring device 1 is provided with a CPU (Central Processing Unit) 21, a laser driving circuit 22, an image signal processing circuit 23, an input/output circuit 24, and a memory 25, which constitute a circuit section.

The laser light source 111 outputs laser light in a narrow wavelength band of or about 830 nm. The collimator lens 112 converts the laser light emitted from the laser light source 111 into parallel light. The aperture 113 adjusts a light flux cross section of laser light into a predetermined shape. The DOE 114 has a diffraction pattern on an incident surface thereof. Laser light entered to the DOE 114 through the aperture 113 is converted into laser light having a dot pattern by a diffractive action of the diffraction pattern, and is irradiated onto a target area.

Laser light reflected on the target area is entered to the imaging lens 122 through the aperture 121. The aperture 121 converts external light into convergent light in accordance with the F-number of the imaging lens 122. The imaging lens 122 condenses the light entered through the aperture 121 on the CMOS image sensor 124.

The filter 123 is a band-pass filter which transmits light in a wavelength band including the emission wavelength band (in the range of about 830 nm) of the laser light source 111, and blocks light in a visible light wavelength band. The CMOS image sensor 124 receives light condensed on the imaging lens 122, and outputs a signal (electric charge) in accordance with a received light amount to the image signal processing circuit 23 pixel by pixel. In this example, the CMOS image sensor 124 is configured in such a manner that the output speed of signals to be outputted from the CMOS image sensor 124 is set high so that a signal (electric charge) at each pixel can be outputted to the image signal processing circuit 23 with high response from a light receiving timing at each pixel.

The CPU 21 controls the parts of the information acquiring device 1 in accordance with a control program stored in the memory 25. By the control program, the CPU 21 has functions of a laser controller 21a for controlling the laser light source 111 and a three-dimensional distance calculator 21b for generating three-dimensional distance information.

The laser driving circuit 22 drives the laser light source 111 in accordance with a control signal from the CPU 21. The image signal processing circuit 23 controls the CMOS image sensor 124 to successively read signals (electric charges) from the pixels, which have been generated in the CMOS image sensor 124, line by line. Then, the image signal processing circuit 23 outputs the read signals successively to the CPU 21. The CPU 21 calculates a distance from the information acquiring device 1 to each portion of an object to be detected, by a processing to be implemented by the three-dimensional distance calculator 21b, based on the signals (image signals) to be supplied from the image signal processing circuit 23. The input/output circuit 24 controls data communications with the information processing device 2.

The information processing device 2 is provided with a CPU 31, an input/output circuit 32, and a memory 33. The information processing device 2 is provided with e.g. an arrangement for communicating with the TV 3, or a drive device for reading information stored in an external memory such as a CD-ROM and installing the information in the memory 33, in addition to the arrangement shown in FIG. 2. The arrangements of the peripheral circuits are not shown in FIG. 2 to simplify the description.

The CPU 31 controls each of the parts of the information processing device 2 in accordance with a control program (application program) stored in the memory 33. By the control program, the CPU 31 has a function of an object detector 31a for detecting an object in an image. The control program is e.g. read from a CD-ROM by an unillustrated drive device, and is installed in the memory 33.

For instance, in the case where the control program is a game program, the object detector 31a detects a person and a motion thereof in an image based on three-dimensional distance information supplied from the information acquiring device 1. Then, the information processing device 2 causes the control program to execute a processing for operating a character on a TV screen in accordance with the detected motion.

Further, in the case where the control program is a program for controlling a function of the TV 3, the object detector 31a detects a person and a motion (gesture) thereof in the image based on three-dimensional distance information supplied from the information acquiring device 1. Then, the information processing device 2 causes the control program to execute a processing for controlling a predetermined function (such as switching the channel or adjusting the volume) of the TV 3 in accordance with the detected motion (gesture).

The input/output circuit 32 controls data communication with the information acquiring device 1.

Figures 3A, 3B:
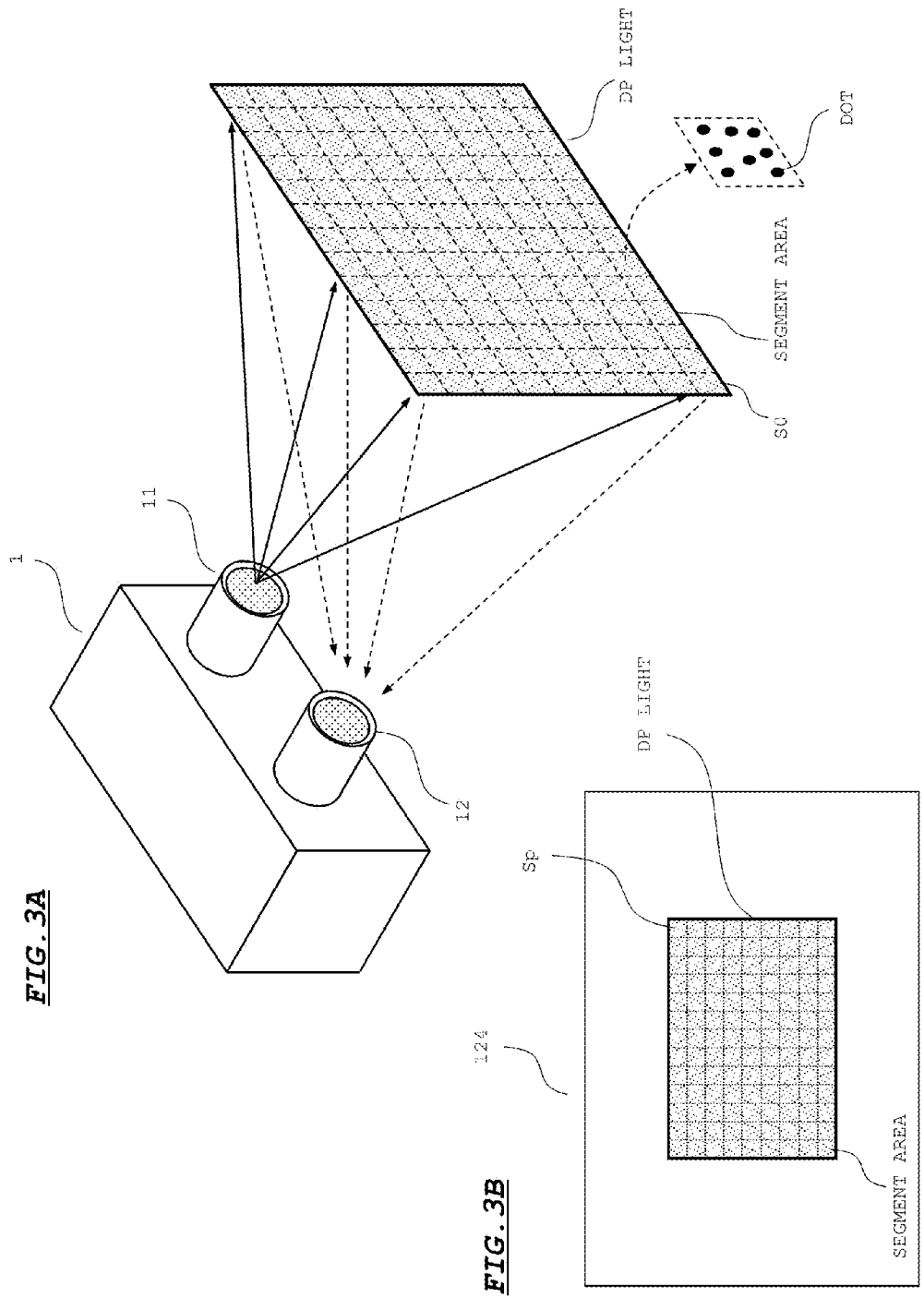
FIGS. 3A and 3B are diagrams respectively showing an irradiation state of laser light onto a target area, and a light receiving state of laser light on an image sensor in the embodiment.

FIG. 3A is a diagram schematically showing an irradiation state of laser light onto a target area. FIG. 3B is a diagram schematically showing a light receiving state of laser light on the CMOS image sensor 124. To simplify the description, FIG. 3B shows a light receiving state in the case where a flat plane (screen) is disposed on a target area.

The projection optical system 11 irradiates a target area with laser light having a dot pattern (hereinafter, the entirety of the laser light having the dot pattern is called as "DP light").

FIG. 3A shows a light flux area of DP light by a solid-line frame. In the light flux of DP light, dot areas (hereinafter, simply called as "dots") in which the intensity of laser light is increased by a diffractive action of the DOE 114 locally appear in accordance with the dot pattern by the diffractive action of the DOE 114.

To simplify the description, in FIG. 3A, a light flux of DP light is divided into segment areas arranged in the form of a matrix. Dots locally appear with a unique pattern in each segment area. The dot appearance pattern in a certain segment area differs from the dot appearance patterns in all the other segment areas. With this configuration, each segment area is identifiable from all the other segment areas by a unique dot appearance pattern of the segment area.

When a flat plane (screen) exists in a target area, the segment areas of DP light reflected on the flat plane are distributed in the form of a matrix on the CMOS image sensor 124, as shown in FIG. 3B. For instance, light of a segment area S0 in the target area shown in FIG. 3A is entered to a segment area Sp shown in FIG. 3B, on the CMOS image sensor 124. In FIG. 3B, a light flux area of DP light is also indicated by a solid-line frame, and to simplify the description, a light flux of DP light is divided into segment areas arranged in the form of a matrix in the same manner as shown in FIG. 3A.

The three-dimensional distance calculator 21b is operable to detect a position of each segment area on the CMOS image sensor 124 for detecting a distance to a position of an object to be detected corresponding to the segment area, based on the detected position of the segment area, using a triangulation method. The details of the above detection method is disclosed in e.g. pp. 1279-1280, the 19th Annual Conference Proceedings (Sep. 18-20, 2001) by the Robotics Society of Japan.

Figure 4A:
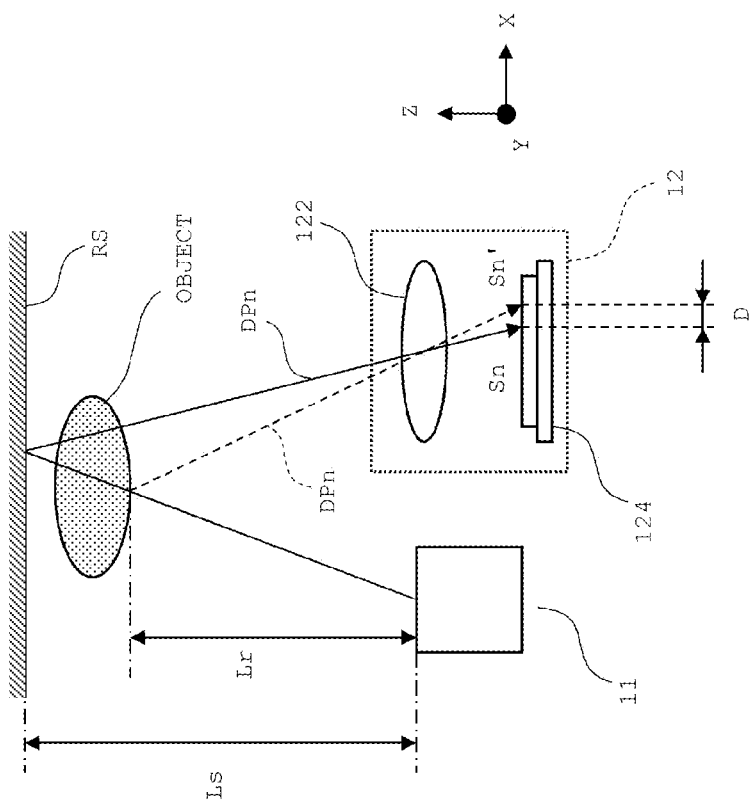
FIGS. 4A and 4B are diagrams for describing a reference template setting method in the embodiment.
Figure 4B:
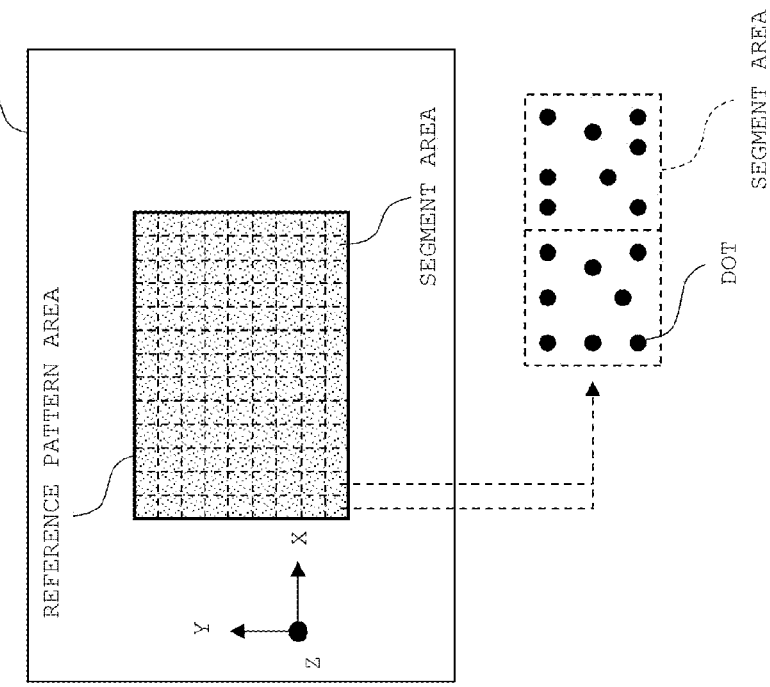

FIGS. 4A, 4B are diagrams schematically showing a reference template generation method for use in the aforementioned distance detection.

As shown in FIG. 4A, at the time of generating a reference template, a reflection plane RS perpendicular to Z-axis direction is disposed at a position away from the projection optical system 11 by a predetermined distance Ls. The temperature of the laser light source 111 is retained at a predetermined temperature (reference temperature). Then, DP light is emitted from the projection optical system 11 for a predetermined time Te in the above state. The emitted DP light is reflected on the reflection plane RS, and is entered to the CMOS image sensor 124 in the light receiving optical system 12. By performing the above operation, an electrical signal at each pixel is outputted from the CMOS image sensor 124. The value (pixel value) of the electrical signal at each outputted pixel is expanded in the memory 25 shown in FIG. 2.

As shown in FIG. 4B, a reference pattern area for defining an irradiation area of DP light on the CMOS image sensor 124 is set, based on the pixel values expanded in the memory 25. Further, the reference pattern area is divided into segment areas in the form of a matrix. As described above, dots locally appear with a unique pattern in each segment area. Accordingly, each segment area has a different pattern of pixel values. Each one of the segment areas has the same size as all the other segment areas.

The reference template is configured in such a manner that pixel values of the pixels included in each segment area set on the CMOS image sensor 124 are correlated to the segment area.

Specifically, the reference template includes information relating to the position of a reference pattern area on the CMOS image sensor 124, pixel values of all the pixels included in the reference pattern area, and information for use in dividing the reference pattern area into segment areas. The pixel values of all the pixels included in the reference pattern area correspond to a dot pattern of DP light included in the reference pattern area. Further, pixel values of pixels included in each segment area are acquired by dividing a mapping area on pixel values of all the pixels included in the reference pattern area into segment areas. The reference template may retain pixel values of pixels included in each segment area, for each segment area.

The reference template thus configured is stored in the memory 25 shown in FIG. 2 in a non-erasable manner. The reference template stored in the memory 25 is referred to in calculating a distance from the projection optical system 11 to each portion of an object to be detected.

For instance, in the case where an object is located at a position nearer to the distance Ls shown in FIG. 4A, DP light (DPn) corresponding to a segment area Sn on the reference pattern is reflected on the object, and is entered to an area Sn' different from the segment area Sn. Since the projection optical system 11 and the light receiving optical system 12 are adjacent to each other in X-axis direction, the displacement direction of the area Sn' relative to the segment area Sn is aligned in parallel to X-axis. In the case shown in FIG. 4A, since the object is located at a position nearer to the distance Ls, the area Sn' is displaced relative to the segment area Sn in plus X-axis direction. If the object is located at a position farther from the distance Ls, the area Sn' is displaced relative to the segment area Sn in minus X-axis direction.

A distance Lr from the projection optical system 11 to a portion of the object irradiated with DP light (DPn) is calculated, using the distance Ls, and based on a displacement direction and a displacement amount of the area Sn' relative to the segment area Sn, by a triangulation method. A distance from the projection optical system 11 to a portion of the object corresponding to the other segment area is calculated in the same manner as described above.

In performing the distance calculation, it is necessary to detect to which position, a segment area Sn of the reference template has displaced at the time of actual measurement. The detection is performed by performing a matching operation between a dot pattern of DP light irradiated onto the CMOS image sensor 124 at the time of actual measurement, and a dot pattern included in the segment area Sn.

Figure 5A:
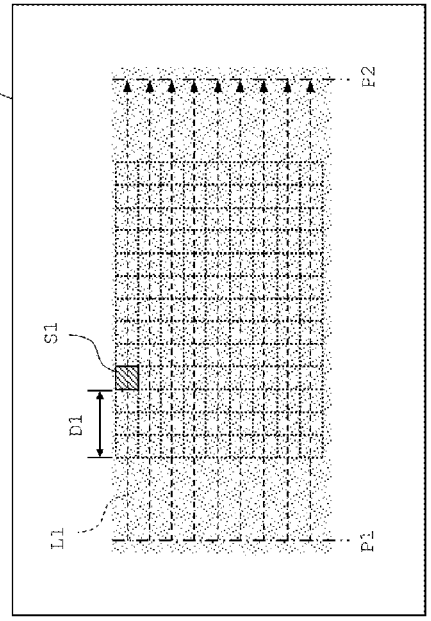
FIGS. 5A through 5C are diagrams for describing a distance detecting method in the embodiment.
Figure 5B:
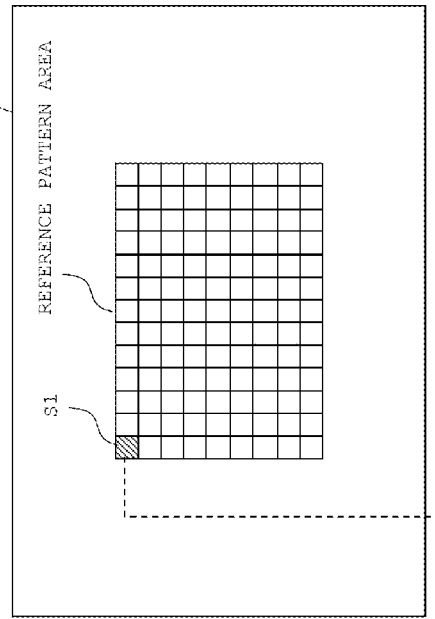
Figure 5C:
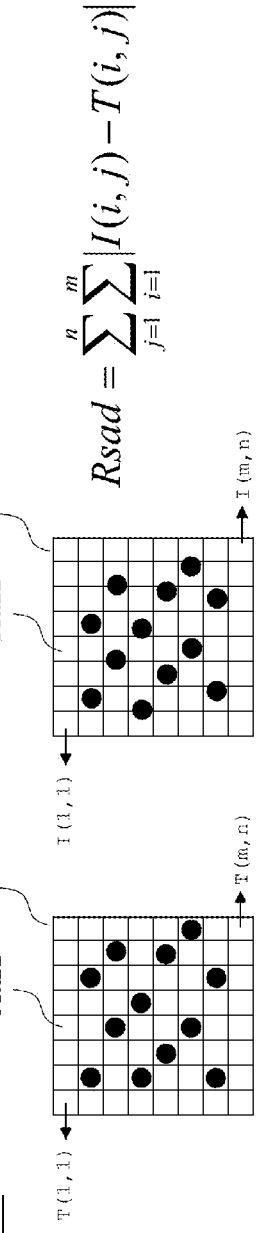

FIGS. 5A through 5C are diagrams for describing the aforementioned detection method. FIG. 5A is a diagram showing a state as to how a reference pattern area and a segment area are set on the CMOS image sensor 124, FIG. 5B is a diagram showing a segment area searching method to be performed at the time of actual measurement, and FIG. 5C is a diagram showing a matching method between an actually measured dot pattern of DP light, and a dot pattern included in a segment area of a reference template.

For instance, in the case where a displacement position of a segment area 51 at the time of actual measurement shown in FIG. 5A is searched, as shown in FIG. 5B, the segment area S1 is fed pixel by pixel in X-axis direction in a range from P1 to P2 for obtaining a matching degree between the dot pattern of the segment area 51, and the actually measured dot pattern of DP light, at each feeding position. In this case, the segment area 51 is fed in X-axis direction only on a line L1 passing an uppermost segment area group in the reference pattern area. This is because, as described above, each segment area is normally displaced only in X-axis direction from a position set by the reference template at the time of actual measurement. In other words, the segment area S1 is conceived to be on the uppermost line L1. By performing a searching operation only in X-axis direction as described above, the processing load for searching is reduced.

At the time of actual measurement, a segment area may be deviated in X-axis direction from the range of the reference pattern area, depending on the position of an object to be detected. In view of the above, the range from P1 to P2 is set wider than the X-axis directional width of the reference pattern area.

At the time of detecting the matching degree, an area (comparative area) of the same size as the segment area S1 is set on the line L1, and a degree of similarity between the comparative area and the segment area S1 is obtained. Specifically, there is obtained a difference between the pixel value of each pixel in the segment area S1, and the pixel value of a pixel, in the comparative area, corresponding to the pixel in the segment area S1. Then, a value Rsad which is obtained by summing up the difference with respect to all the pixels in the comparative area is acquired as a value representing the degree of similarity.

For instance, as shown in FIG. 5C, in the case where pixels of m columns by n rows are included in one segment area, there is obtained a difference between a pixel value T(i, j) of a pixel at i-th column, j-th row in the segment area, and a pixel value I(i, j) of a pixel at i-th column, j-th row in the comparative area. Then, a difference is obtained with respect to all the pixels in the segment area, and the value Rsad is obtained by summing up the differences. In other words, the value Rsad is calculated by the following formula.

$$Rsad = \sum_{j=1}^{n} \sum_{i=1}^{m} |I(i, j) - T(i, j)| \quad (1)$$

As the value Rsad is smaller, the degree of similarity between the segment area and the comparative area is high.

At the time of a searching operation, the comparative area is sequentially set in a state that the comparative area is displaced pixel by pixel on the line L1. Then, the value Rsad is obtained for all the comparative areas on the line L1. A value Rsad smaller than a threshold value is extracted from among the obtained values Rsad. In the case where there is no value Rsad smaller than the threshold value, it is determined that the searching operation of the segment area S1 has failed. In this case, a comparative area having a smallest value among the extracted values Rsad is determined to be the area to which the segment area S1 has moved. The segment areas other than the segment area S1 on the line L1 are searched in the same manner as described above. Likewise, segment areas on the other lines are searched in the same manner as described above by setting a comparative area on the other line.

In the case where the displacement position of each segment area is searched from the dot pattern of DP light acquired at the time of actual measurement in the aforementioned manner, as described above, the distance to a portion of the object to be detected corresponding to each segment area is obtained based on the displacement positions, using a triangulation method.

It is not always the case that DP light is irradiated onto the CMOS image sensor 124 in such a state that each dot of a dot pattern of DP light acquired at the time of actual measurement is located within an area of a corresponding pixel on the CMOS image sensor 124. DP light may be frequently irradiated onto the CMOS image sensor 124 in such a state that a dot overlaps two pixels or four pixels on the CMOS image sensor 124. A dot is shifted horizontally (X-axis direction), depending on a distance to an object to be detected. Accordingly, as shown in FIG. 5C, DP light may be irradiated onto the CMOS image sensor 124 in such a state that a dot overlaps two pixels horizontally (X-axis direction). Normally, a dot does not overlap pixels vertically (Y-axis direction). However, a dot may be shifted vertically (Y-axis direction) resulting from e.g. a change in the characteristic of the DOE 114 or a variation in the emission wavelength of the laser light source 111 based on a temperature change. In such a case, a dot may overlap two pixels vertically (Y-axis direction).

If a dot overlaps plural pixels as described above, signals are concurrently outputted from the pixels adjacent to each other. As a result, a border may disappear from a pixel pattern of outputting signals. This may degrade the matching precision between a segment area and a comparative area.

FIGS. 6A through 6F are diagrams showing a dot pattern setting example (comparative example). The dot pattern may be modified by adjusting the diffractive pattern of the DOE 114.

In FIGS. 6A through 6F, one pixel corresponds to one square. Further, black circles in upper diagrams of FIGS. 6A through 6C indicate a dot (light), and the intensity of an output value (pixel value) of each pixel is expressed by a shading state of squares in lower diagrams of FIGS. 6D through 6F. In lower diagrams of FIGS. 6D through 6F, a white square indicates that the pixel value is zero, and a black square indicates a pixel value (pixel value=H) in the case where one dot is entered only in one pixel. The size of a dot is set smaller than the area of one pixel.

Hereafter, the border means a section including the pixel(s) with the same pixel value(s) which is distinct from the pixel value of the pixel adjacent to the section.

In the setting example shown in FIGS. 6A through 6F, the pitch of dots in X-axis direction and in Y-axis direction is set to 2 pixels. FIGS. 6A, 6B and 6C show the relations between dots and pixels on the CMOS image sensor 124, and FIGS. 6D, 6E and 6F respectively show states of a signal output value (pixel value) of each pixel in the case where dots are irradiated in the states shown in FIGS. 6A, 6B and 6C. FIGS. 6B and 6E show an irradiation state of dots and a state of pixel values in segment areas at the time of generating a reference template; and FIGS. 6A, 6D and FIGS. 6C, 6F show irradiation states of dots and states of pixel values in the case where the dot pattern shown in FIG. 6B is irradiated onto predetermined comparative areas at the time of actual measurement.

In the case where a dot is located within one pixel, as shown in FIG. 6B, a signal of a pixel value H is outputted from a corresponding pixel as shown in FIG. 6E.

On the other hand, at the time of actual measurement, as shown in FIG. 6C, if the dot pattern is deviated with respect to the comparative areas in left direction (minus X-axis direction) by half pixel, as shown in FIG. 6F, a signal of a pixel value H/2 is outputted from all the pixels in each of the second, fourth, sixth and eighth rows from the uppermost row. In this case, there is no border (a section of a pixel having a pixel value of zero) in a pixel pattern of outputting signals, in each of the second, fourth, sixth and eighth rows from the uppermost row. As a result, it is difficult to perform a matching operation between the pixel value patterns shown in FIGS. 6E and 6F by comparison.

Further, at the time of actual measurement, as shown in FIG. 6A if the dot pattern is deviated with respect to the comparative areas in left direction (minus X-axis direction) and in upper direction (plus Y-axis direction) by half pixel, as shown in FIG. 6D, a signal of a pixel value H/4 is outputted from all the pixels. In this case, there is no border in a pixel pattern of outputting signals with respect to all the comparative areas. As a result, it is more difficult to perform a matching operation between the pixel value patterns shown in FIGS. 6E and 6D by comparison.

FIGS. 7A through 7F are diagrams showing another dot pattern setting example (comparative example). FIGS. 7A through 7F respectively correspond to FIGS. 6A through 6F. In this setting example, the size of one dot is also set smaller than the area of one pixel. Further, in this setting example, the pitch of dots in X-axis direction is set to 1 pixel or 2 pixels, and the pitch of dots in Y-axis direction is set to 2 pixels.

Figure 7A:
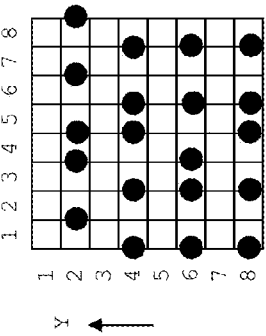
FIGS. 7A through 7F are diagrams for describing a drawback to be involved in the case where the pitch of a dot is equal to 2 pixels or smaller.
Figure 7B:
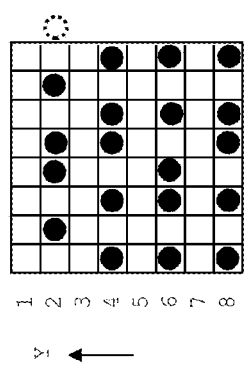
Figure 7C:
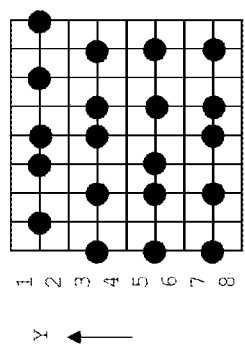
Figure 7D:
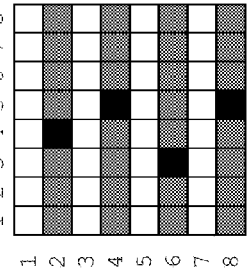
Figure 7E:
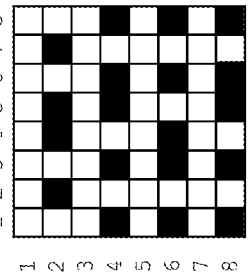
Figure 7F:
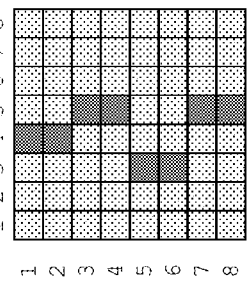

At the time of actual measurement, as shown in FIG. 7C, if the dot pattern is deviated with respect to the comparative areas in left direction (minus X-axis direction) by half pixel, as shown in FIG. 7F, only one pixel has a pixel value H, and the rest of the pixels have a pixel value H/2 in each of the second, fourth, sixth and eighth rows from the uppermost row. In this case, there remain some borders in the pixel pattern of each of the second, fourth, sixth and eighth rows from the uppermost row, as compared with the case shown in FIG. 6F. However, the number of borders in the pixel pattern of each of the second, fourth, sixth and eighth rows is significantly small, as compared with the case shown in FIG. 7E. Accordingly, it is difficult to perform a matching operation between the pixel value patterns shown in FIGS. 7E and 7F by comparison.

Further, at the time of actual measurement, as shown in FIG. 7A, if the dot pattern is deviated with respect to the comparative areas in left direction (minus X-axis direction) and in upper direction (plus Y-axis direction) by half pixel, as shown in FIG. 7D, only one pixel has a pixel value H/2, and the rest of the pixels have a pixel value H/4 in each row. In this case, there remain some borders in the pixel pattern of each row, as compared with the case shown in FIG. 6D. However, the number of borders in the pixel pattern of each of the second, fourth, sixth and eighth rows is significantly small, as compared with the case shown in FIG. 7E. Further, the pixel value patterns in the first, third, fifth and seventh rows from the uppermost row differ from each other between FIG. 7D and FIG. 7E. Accordingly, it is difficult to perform a matching operation between the pixel value patterns shown in FIGS. 7D and 7E by comparison.

FIGS. 8A through 8F are diagrams showing a dot pattern setting example in the embodiment. In this arrangement, it is also possible to set the dot pattern as shown in FIGS. 8A through 8F by adjusting the diffractive pattern of the DOE 114.

FIGS. 8A through 8F respectively correspond to FIGS. 6A through 6F. In this setting example, the size of one dot is also set smaller than the area of one pixel. Further, in this setting example, the pitch of dots in X-axis direction is set to 2.5 pixels, and the pitch of dots in Y-axis direction is set to 2 pixels.

At the time of actual measurement, as shown in FIG. 8C, if the dot pattern is deviated with respect to the comparative areas in left direction (minus X-axis direction) by half pixel, as shown in FIG. 8F, three borders having a pixel value of zero are formed in the pixel value pattern in each of the second, fourth, sixth and eight rows from the uppermost row. On the other hand, three borders having a pixel value of zero are also formed in the pixel value pattern in each of the second, fourth, sixth and eight rows from the uppermost row in FIG. 8E. Thus, the number of borders is the same as each other between FIG. 8E and FIG. 8F. Further, the positions of the borders coincide with each other or are displaced from each other by a distance corresponding to about one pixel between FIGS. 8E and 8F. Thus, the pixel value pattern shown in FIG. 8F is analogous to the pixel value pattern shown in FIG. 8E. Accordingly, it is easy to perform a matching operation between the pixel value patterns shown in FIGS. 8E and 8F by comparison.

Further, at the time of actual measurement, as shown in FIG. 8A, if the dot pattern is deviated with respect to the comparative areas in left direction (minus X-axis direction) and in upper direction (plus Y-axis direction) by half pixel, as shown in FIG. 8D, three borders having a pixel value of zero are formed in the pixel value pattern in each of the second, fourth, sixth and eight rows from the uppermost row. On the other hand, three borders having a pixel value of zero are also formed in the pixel value pattern in each of the second, fourth, sixth and eighth rows in FIG. 8E. Thus, the number of borders is the same as each other between FIG. 8E and FIG. 8D. Further, the positions of the borders in each of the second, fourth, sixth and eight rows coincide with each other or are displaced by a distance corresponding to about one pixel between FIGS. 8E and 8D. Thus, the pixel value pattern shown in FIG. 8D is analogous to the pixel value pattern shown in FIG. 8E.

Further, comparing the first, third, fifth and seventh rows between FIG. 8E and FIG. 8D, a degree of difference between FIGS. 8E and 8D is small, as compared with the difference in the pixel value pattern in the first, third, fifth and seventh rows between FIG. 6E and FIG. 6D, or the difference in the pixel value pattern in the first, third, fifth and seventh rows between FIG. 7E and FIG. 7D. Accordingly, it is conceived that the difference in the pixel value pattern in the first, third, fifth and seventh rows between FIG. 8E and FIG. 8D does not significantly affect the matching determination between the pixel value patterns shown in FIGS. 8E and 8D.

As described above, in the aforementioned setting example of the embodiment, even if a dot pattern is deviated with respect to the comparative areas in left direction (minus X-axis direction) and in upper direction (plus Y-axis direction) by half pixel, it is easy to perform a matching operation between the pixel value patterns shown in FIGS. 8E and 8D.

FIGS. 9A through 9F are diagrams showing another dot pattern setting example in the embodiment. FIGS. 9A through 9F respectively correspond to FIGS. 6A through 6F. In this setting example, the size of one dot is also set smaller than the area of one pixel. Further, in this setting example, the pitch of dots in X-axis direction is set to 2.5 pixels, and the pitch of dots in Y-axis direction is also set to 2.5 pixels.

Figure 9A:
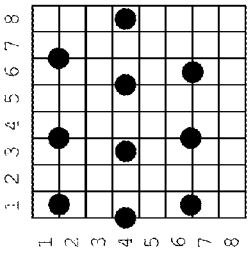
FIGS. 9A through 9F are diagrams showing another dot pattern setting method in the embodiment.
Figure 9B:
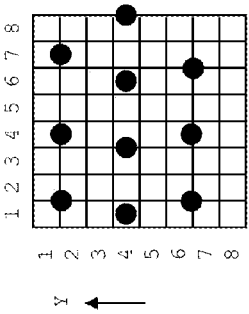
Figure 9C:
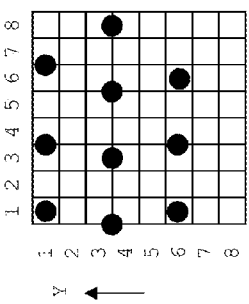
Figure 9D:
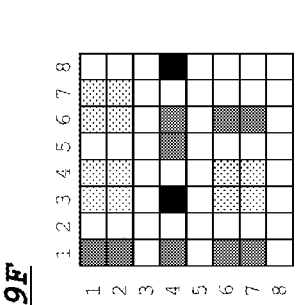
Figure 9E:
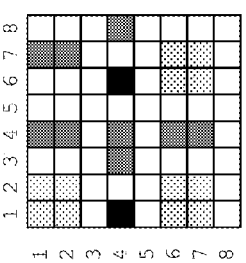
Figure 9F:
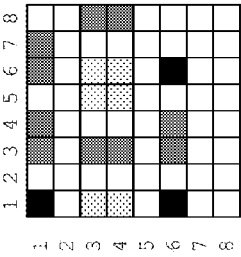

At the time of actual measurement, as shown in FIG. 9C, if the dot pattern is deviated with respect to the comparative areas in left direction (minus X-axis direction) by half pixel, as shown in FIG. 9F, three borders having a pixel value of zero are formed in the pixel value pattern in each of the first, second, fourth, sixth and seventh rows from the uppermost row. On the other hand, three borders having a pixel value of zero are also formed in the pixel value pattern in each of the first, second, fourth, sixth and seventh rows in FIG. 9E. Thus, the number of borders is the same as each other between FIG. 9E and FIG. 9F. Further, the positions of the borders coincide with each other or are displaced from each other by a distance corresponding to about one pixel between FIGS. 9E and 9F. Thus, the pixel value pattern shown in FIG. 9F is analogous to the pixel value pattern shown in FIG. 9E. Accordingly, it is easy to perform a matching operation between the pixel value patterns shown in FIGS. 9E and 9F by comparison.

Further, at the time of actual measurement, as shown in FIG. 9A, if the dot pattern is deviated with respect to the comparative areas in left direction (minus X-axis direction) and in upper direction (plus Y-axis direction) by half pixel, as shown in FIG. 9D, three borders having a pixel value of zero are formed in the pixel value pattern in each of the first, fourth and sixth rows from the uppermost row. On the other hand, three borders having a pixel value of zero are also formed in the pixel value pattern in each of the first, fourth and sixth rows in FIG. 9E. Thus, the number of borders is the same as each other between FIG. 9E and FIG. 9D. Further, the positions of the borders in each of the first, fourth and sixth rows coincide with each other or are displaced from each other by a distance corresponding to about one pixel between FIGS. 9E and 9D. Furthermore, the pixel value patterns in the fifth and eight rows coincide with each other between FIGS. 9E and 9D. Thus, the pixel value pattern shown in FIG. 9D is analogous to the pixel value pattern shown in FIG. 9E.

Further, comparing the second and seventh rows between FIG. 9E and FIG. 9D, a degree of difference between FIGS. 9E and 9D is small, as compared with the difference in the pixel value pattern in the first, third, fifth and seventh rows between FIG. 6E and FIG. 6D, or the difference in the pixel value pattern in the first, third, fifth and seventh rows between FIG. 7E and FIG. 7D. Accordingly, it is conceived that the difference in the pixel value pattern in the second and seventh rows between FIG. 9E and FIG. 9D does not significantly affect the matching determination between the pixel value patterns shown in FIGS. 9E and 9D.

As described above, in the aforementioned setting example of the embodiment, even if a dot pattern is deviated with respect to the comparative areas in left direction (minus X-axis direction) and in upper direction (plus Y-axis direction) by half pixel, it is easy to perform a matching operation between the pixel value patterns shown in FIGS. 9E and 9D.

In the setting example shown in FIGS. 9A through 9F, as is clear from referring to FIGS. 9E, 9D and 9F, there exist three or four rows, in which the pixel value of all the pixels is zero, and the pixel value pattern is comparted in Y-axis direction, as well as in X-axis direction, by these rows. In this example, the number of borders in Y-axis direction is the same (three) in FIGS. 9E, 9D and 9F. Further, the positions of the borders in Y-axis direction coincide with each other between FIG. 9E and FIG. 9F, and coincide with each other or are displaced from each other by a distance corresponding to one pixel between FIGS. 9E and 9D. Forming borders in a pixel value pattern in Y-axis direction as well as in X-axis direction is advantageous in performing a matching operation between pixel value patterns, and enhancing the searching precision of a segment area.

FIGS. 10A through 10F are diagrams showing yet another dot pattern setting example in the embodiment. FIGS. 10A through 10F respectively correspond to FIGS. 6A through 6F. In this setting example, the size of one dot is also set smaller than the area of one pixel. Further, in this setting example, the pitch of dots in X-axis direction is set to 3 pixels, and the pitch of dots in Y-axis direction is set to 2 pixels.

Figure 10A:
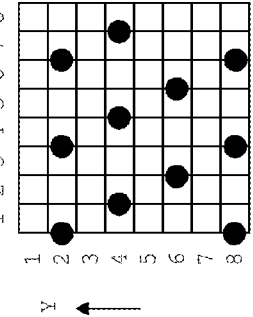
FIGS. 10A through 10F are diagrams showing yet another dot pattern setting method in the embodiment.
Figure 10B:
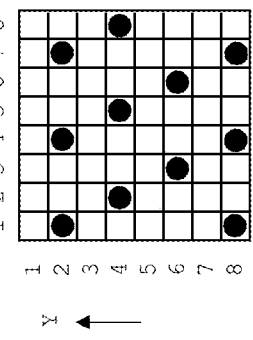
Figure 10C:
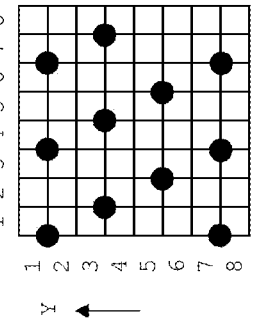
Figure 10D:
Figure 10E:
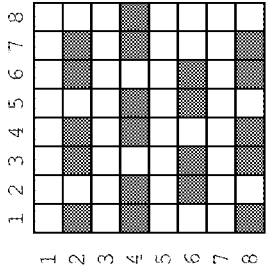
Figure 10F:
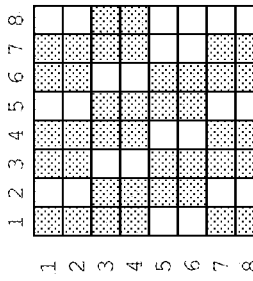

At the time of actual measurement, as shown in FIG. 10C, if the dot pattern is deviated with respect to the comparative areas in left direction (minus X-axis direction) by half pixel, as shown in FIG. 10F, three borders having a pixel value of zero are formed in the pixel value pattern in each of the second, fourth, sixth and eighth rows from the uppermost row. On the other hand, three borders having a pixel value of zero are also formed in the pixel value pattern in each of the second, fourth, sixth and eighth rows in FIG. 10E. Thus, the number of borders is the same as each other between FIG. 10E and FIG. 10F. Further, all the positions of the borders in each of the second, fourth, sixth and eighth rows in FIG. 10F are included in the positions of the borders in each of the second, fourth, sixth and eighth rows in FIG. 10E. Thus, the pixel value pattern shown in FIG. 10F is analogous to the pixel value pattern shown in FIG. 10E. Accordingly, it is easy to perform a matching operation between the pixel value patterns shown in FIGS. 10E and 10F by comparison.

At the time of actual measurement, as shown in FIG. 10A, if the dot pattern is deviated with respect to the comparative areas in left direction (minus X-axis direction) and in upper direction (plus Y-axis direction) by half pixel, as shown in FIG. 10D, three borders having a pixel value of zero are formed in the pixel value pattern in each of the second, fourth, sixth and eighth rows from the uppermost row. On the other hand, three borders having a pixel value of zero are also formed in the pixel value pattern in each of the second, fourth, sixth and eighth rows in FIG. 10E. Thus, the number of borders is the same as each other between FIG. 10E and FIG. 10D. Further, all the positions of the borders in each of the second, fourth, sixth and eighth rows in FIG. 10D are included in the positions of the borders in each of the second, fourth, sixth and eighth rows in FIG. 10E. Thus, the pixel value pattern shown in FIG. 10D is very analogous to the pixel value pattern shown in FIG. 10E.

Further, comparing the first, third, fifth and seventh rows between FIG. 10E and FIG. 10D, a degree of difference between FIGS. 10E and 10D is small, as compared with the difference in the pixel value pattern in the first, third, fifth and seventh rows between FIG. 6E and FIG. 6D, or the difference in the pixel value pattern in the first, third, fifth and seventh rows between FIG. 7E and FIG. 7D. Accordingly, it is conceived that the difference in the pixel value pattern in the first, third, fifth and seventh rows between FIG. 10E and FIG. 10D does not significantly affect the matching determination between the pixel value patterns shown in FIGS. 10E and 10D.

As described above, in the aforementioned setting example of the embodiment, even if a dot pattern is deviated with respect to the comparative areas in left direction (minus X-axis direction) and in upper direction (plus Y-axis direction) by half pixel, it is easy to perform a matching operation between the pixel value patterns shown in FIGS. 10E and 10D.

Between the pixel value patterns shown in FIGS. 10E and 10F, the number of pixels whose pixel values do not coincide with each other is five in the second row, six in the fourth row, four in the sixth row, and five in the eighth row; namely, the number is twenty in total. On the other hand, between the pixel value patterns shown in FIGS. 8E and 8F, the number of pixels whose pixel values do not coincide with each other is six in the second row, six in the fourth row, six in the sixth row, and six in the eighth row; namely, the number is twenty-four in total. Thus, the number of pixels whose pixel values do not coincide with each other is smaller in the pixel value patterns shown in FIGS. 10E and 10F than in the pixel value patterns shown in FIGS. 8E and 8F, by four. Further, a pixel value difference between two pixels whose pixel values do not coincide with each other is H/2 in all the cases. Thus, it is conceived that the matching detection precision is higher in the dot patterns shown in FIGS. 10A through 10F than in the dot patterns shown in FIGS. 8A through 8F. In this aspect, it is further preferable to set the pitch of dots to 3 pixels, rather than 2.5 pixels.

FIGS. 11A through 11F are diagrams showing still another dot pattern setting example in the embodiment. FIGS. 11A through 11F respectively correspond to FIGS. 6A through 6F. In this setting example, the size of one dot is also set smaller than the area of one pixel. Further, in this setting example, the pitch of dots in X-axis direction is set to 3.5 pixels, and the pitch of dots in Y-axis direction is set to 2 pixels.

Comparing the matching degree of the pixel value patterns shown in FIGS. 11E and 11F, and the matching degree of the pixel value patterns shown in FIGS. 10E and 10F, the matching degrees are substantially the same as each other. Specifically, between the pixel value patterns shown in FIGS. 11E and 11F, the number of pixels whose pixel values do not coincide with each other is five in the second row, six in the fourth row, four in the sixth row, and five in the eighth row; namely, the number is twenty in total. On the other hand, between the pixel value patterns shown in FIGS. 10E and 10F, the number of pixels whose pixel values do not coincide with each other is five in the second row, six in the fourth row, four in the sixth row, and five in the eighth row; namely, the number is twenty in total. Thus, the number of pixels whose pixel values do not coincide with each other is the same as each other between the pixel value patterns shown in FIGS. 11E and 11F and the pixel value patterns shown in FIGS. 10E and 10F. Further, a pixel value difference between two pixels whose pixel values do not coincide with each other is H/2 in all the cases. Thus, it is conceived that the matching detection precision is substantially the same as each other between the dot patterns shown in FIGS. 11A through 11F and the dot patterns shown in FIGS. 10A through 10F.

In this aspect, it is conceived that the dot pattern searching precision substantially does not change, even if the pitch of dots in X-axis direction is set to 3.5 pixels or larger. Contrary to the expectation, if the pitch of dots is increased, the number of dots to be included in one segment area is reduced. As a result, it is difficult to obtain a difference in the value Rsad (see the aforementioned formula (1)) representing a degree of similarity, which may degrade the dot pattern searching precision. In view of the above, it is desirable to set the pitch of dots in X-axis direction in the range of from about 2.5 pixels to about 3.5 pixels, and more preferable to set the pitch to about 3.0 pixels. It is preferable to set the pitch of dots in X-axis direction to 2.5 pixels in order to include a larger number of dots in one segment area.

As described above, according to the embodiment, it is possible to implement an information acquiring device that enables to enhance the dot pattern detection precision, and an object detecting device loaded with the information acquiring device. Further, the aforementioned effect can be realized by a very simplified method of adjusting the pitch of dots.

The embodiment of the invention has been described as above. The invention is not limited to the foregoing embodiment, and the embodiment of the invention may be changed or modified in various ways other than the above.

For instance, in the embodiment, the segment areas are set without overlapping each other, as shown in FIG. 4B. Alternatively, segment areas may be set in such a manner that upper and lower segment areas partially overlap each other. Further alternatively, segment areas may be set in such a manner that left and right segment areas partially overlap each other in the form of a matrix. In the modifications, however, the pitch of dots within each segment area is adjusted to be equal to or larger than 2.5 pixels.

Further alternatively, the shape of the reference pattern area may be a square shape or other shape, in addition to the rectangular shape as described in the embodiment.

In the embodiment, the CMOS image sensor 124 is used as a light receiving element. Alternatively, a CCD image sensor may be used.

The embodiment of the invention may be changed or modified in various ways as necessary, as far as such changes and modifications do not depart from the scope of the claims of the invention hereinafter defined.

What is claimed is:

1. An information acquiring device for acquiring information on a target area using light, comprising:
    a light source which emits light of a predetermined wavelength band;
    a projection optical system which projects the light emitted from the light source toward the target area with a predetermined dot pattern; and
    a light receiving element which receives reflected light reflected on the target area for outputting a signal, wherein
    the projection optical system projects the light toward the target area in such a manner that a dot of a reference pattern of the light to be received by the light receiving element has a pitch equal to or larger than 2.5 pixels at least in an alignment direction in which the light source and the light receiving element are aligned.

2. The information acquiring device according to claim 1, wherein
    the projection optical system projects the light toward the target area in such a manner that a dot of a reference pattern of the light to be received by the light receiving element has a pitch equal to or larger than 2.5 pixels in an alignment direction in which the light source and the light receiving element are aligned, and in a direction perpendicular to the alignment direction.

3. The information acquiring device according to claim 1, wherein
    the pitch in the alignment direction is set to 2.5 to 3.5 pixels.

4. The information acquiring device according to claim 3, wherein
the pitch in the alignment direction is set to 2.5 pixels.

5. The information acquiring device according to claim 3, wherein
the pitch in the alignment direction is set to 3.0 pixels.

6. The information acquiring device according to claim 2, wherein
the pitch in the alignment direction is set to 2.5 to 3.5 pixels.

7. The information acquiring device according to claim 6, wherein
the pitch in the alignment direction is set to 2.5 pixels.

8. The information acquiring device according to claim 6, wherein
the pitch in the alignment direction is set to 3.0 pixels.

9. An object detecting device, comprising:
an information acquiring device which acquires information on a target area using light,
the information acquiring device including:
a light source which emits light of a predetermined wavelength band;
a projection optical system which projects the light emitted from the light source toward the target area with a predetermined dot pattern; and
a light receiving element which receives reflected light reflected on the target area for outputting a signal, wherein
the projection optical system projects the light toward the target area in such a manner that a dot of a reference pattern of the light to be received by the light receiving element has a pitch equal to or larger than 2.5 pixels at least in an alignment direction in which the light source and the light receiving element are aligned.

10. The object detecting device according to claim 9, wherein
the projection optical system projects the light toward the target area in such a manner that a dot of a reference pattern of the light to be received by the light receiving element has a pitch equal to or larger than 2.5 pixels in an alignment direction in which the light source and the light receiving element are aligned, and in a direction perpendicular to the alignment direction.

11. The object detecting device according to claim 9, wherein
the pitch in the alignment direction is set to 2.5 to 3.5 pixels.

12. The object detecting device according to claim 11, wherein
the pitch in the alignment direction is set to 2.5 pixels.

13. The object detecting device according to claim 11, wherein
the pitch in the alignment direction is set to 3.0 pixels.

14. The object detecting device according to claim 10, wherein
the pitch in the alignment direction is set to 2.5 to 3.5 pixels.

15. The object detecting device according to claim 14, wherein
the pitch in the alignment direction is set to 2.5 pixels.

16. The object detecting device according to claim 14, wherein
the pitch in the alignment direction is set to 3.0 pixels.

* * * * *